(12) United States Patent
Omori

(10) Patent No.: US 10,834,325 B2
(45) Date of Patent: Nov. 10, 2020

(54) RECORDING APPARATUS, METHOD FOR CONTROLLING THE SAME, AND RECORDING MEDIUM

(71) Applicant: CANON KABUSHIKI KAISHA, Tokyo (JP)

(72) Inventor: Noboru Omori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/144,869

(22) Filed: Sep. 27, 2018

(65) Prior Publication Data

US 2019/0037145 A1 Jan. 31, 2019

Related U.S. Application Data

(63) Continuation of application No. PCT/JP2017/012668, filed on Mar. 28, 2017.

(30) Foreign Application Priority Data

Mar. 31, 2016 (JP) ................. 2016-071946

(51) Int. Cl.
| | |
|---|---|
| H04N 5/232 | (2006.01) |
| G06F 12/16 | (2006.01) |
| H04N 1/00 | (2006.01) |
| H04N 1/21 | (2006.01) |
| H04N 5/80 | (2006.01) |

(Continued)

(52) U.S. Cl.
CPC ....... *H04N 5/232941* (2018.08); *G01K 1/024* (2013.01); *G01K 1/026* (2013.01); *G01K 13/00* (2013.01); *G06F 3/0617* (2013.01); *G06F 3/0658* (2013.01); *G06F 3/0679* (2013.01); *G06F 12/16* (2013.01); *H04N 1/0048* (2013.01); *H04N 1/00148* (2013.01); *H04N 1/00172* (2013.01); *H04N 1/00814* (2013.01); *H04N 1/00824* (2013.01); *H04N 1/00925* (2013.01); *H04N 1/21* (2013.01); *H04N 1/2125* (2013.01); *H04N 1/2129* (2013.01);

(Continued)

(58) Field of Classification Search
CPC ............... H04N 5/232941; H04N 5/22521
See application file for complete search history.

(56) References Cited

U.S. PATENT DOCUMENTS

| | | | |
|---|---|---|---|
| 2010/0023678 A1* | 1/2010 | Nakanishi | ............... G06F 1/206 711/103 |
| 2010/0082890 A1* | 4/2010 | Heo | ..................... G06F 12/0246 711/103 |

(Continued)

FOREIGN PATENT DOCUMENTS

| | | |
|---|---|---|
| JP | 2003-141702 A | 5/2003 |
| JP | 2004-289307 A | 10/2004 |

(Continued)

*Primary Examiner* — Girumsew Wendmagegn
(74) *Attorney, Agent, or Firm* — Canon U.S.A., Inc., IP Division

(57) ABSTRACT

A recording apparatus (100) which records content in a recording medium (113 and 114) includes an obtaining unit which obtains information on a temperature of the recording medium (S311) and a display controller which performs control such that display associated with the temperature of the recording medium is performed based on the temperature information obtained by the obtaining unit (S314).

18 Claims, 10 Drawing Sheets

(51) Int. Cl.
*G01K 13/00* (2006.01)
*G01K 1/02* (2006.01)
*G06F 3/06* (2006.01)
*H04N 17/00* (2006.01)

(52) U.S. Cl.
CPC ............. *H04N 1/2158* (2013.01); *H04N 5/80* (2013.01); *H04N 17/002* (2013.01); *H04N 2201/0084* (2013.01)

(56) References Cited

U.S. PATENT DOCUMENTS

2012/0050551 A1* 3/2012 Ishibashi .......... H04N 21/43635
348/208.1
2016/0085290 A1* 3/2016 Skandakumaran ... G06F 1/3268
713/320

FOREIGN PATENT DOCUMENTS

| JP | 2006-313978 A | 11/2006 |
| JP | 2008-90875 A | 4/2008 |
| JP | 2009-81742 A | 4/2009 |
| JP | 2012-165373 A | 8/2012 |

\* cited by examiner

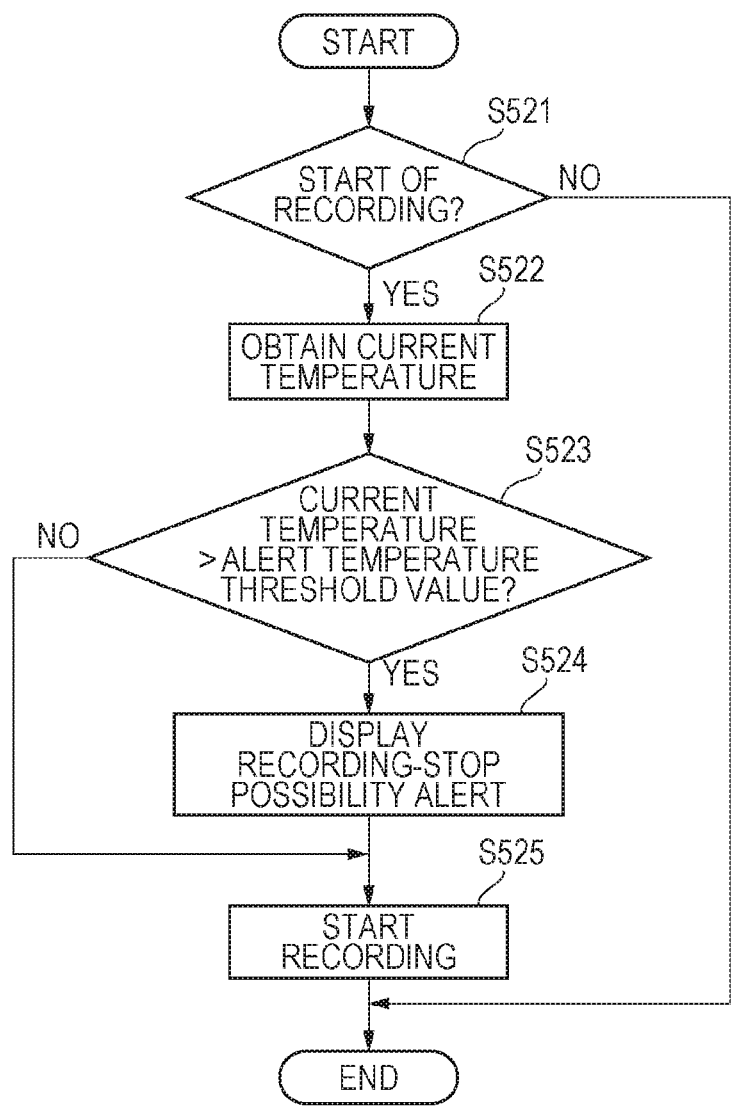

RECORDING APPARATUS, METHOD FOR CONTROLLING THE SAME, AND RECORDING MEDIUM

CROSS-REFERENCE TO RELATED APPLICATIONS

This application is a Continuation of International Patent Application No. PCT/JP2017/012668, filed Mar. 28, 2017, which claims the benefit of Japanese Patent Application No. 2016-071946, filed Mar. 31, 2016, both of which are hereby incorporated by reference herein in their entirety.

TECHNICAL FIELD

The present invention relates to a recording apparatus which records content in a recording medium.

BACKGROUND ART

A recording medium, such as a secure digital (SD) card, a compact flash (CF) card (registered trademark), or a CFast card (CFast: registered trademark) may be attached to a recording apparatus, such as a digital still camera. In recent years, a physical interface used to improve speed performance of recording media is changed from serial to parallel and parallel to high-speed serial, and therefore, temperature of the recording media is easily increased. If a temperature of a recording medium is increased, a recording element may fail. Therefore, a recording apparatus which reduces a speed for accessing a recording medium or which stops access to the recording medium has been developed so that a recording element does not fail when a temperature of the recording medium is increased.

PTL 1 discloses a disk storage apparatus which prohibits a writing operation on a recording medium when a temperature value detected by a temperature sensor is equal to or smaller than a low temperature limit of a magnetic recording characteristic.

CITATION LIST

Patent Literature

PTL 1 Japanese Patent Laid-Open No. 2003-141702

The present invention is made in view of the foregoing problem and is provided for a user to recognize information on a temperature of a recording medium.

SUMMARY OF INVENTION

A recording apparatus according to the present invention includes an obtaining unit configured to obtain information on a temperature of a recording medium, and a display controller configured to perform control such that display associated with the temperature of the recording medium is performed when the temperature information obtained by the obtaining unit satisfies a predetermined condition.

Further features of the present invention will become apparent from the following description of exemplary embodiments with reference to the attached drawings.

BRIEF DESCRIPTION OF DRAWINGS

FIGS. 5A to 5E are flowcharts illustrating processes according to a second embodiment.

DESCRIPTION OF EMBODIMENTS

Hereinafter, embodiments of the present invention will be described with reference to the accompanying drawings. Here, a digital still camera 100 is taken as an example of a recording apparatus which records content in a recording medium. Furthermore, it is assumed that the recording medium is a memory card and the content is an image captured by the digital still camera 100.

First Embodiment

In a first embodiment, a high-temperature icon (an item for a notification of temperature information) is displayed in association with a temperature of a memory card when the temperature of the memory card or a bit rate (a processing speed) obtained when an image is recorded in the memory card satisfies a predetermined condition.

Figure 1:
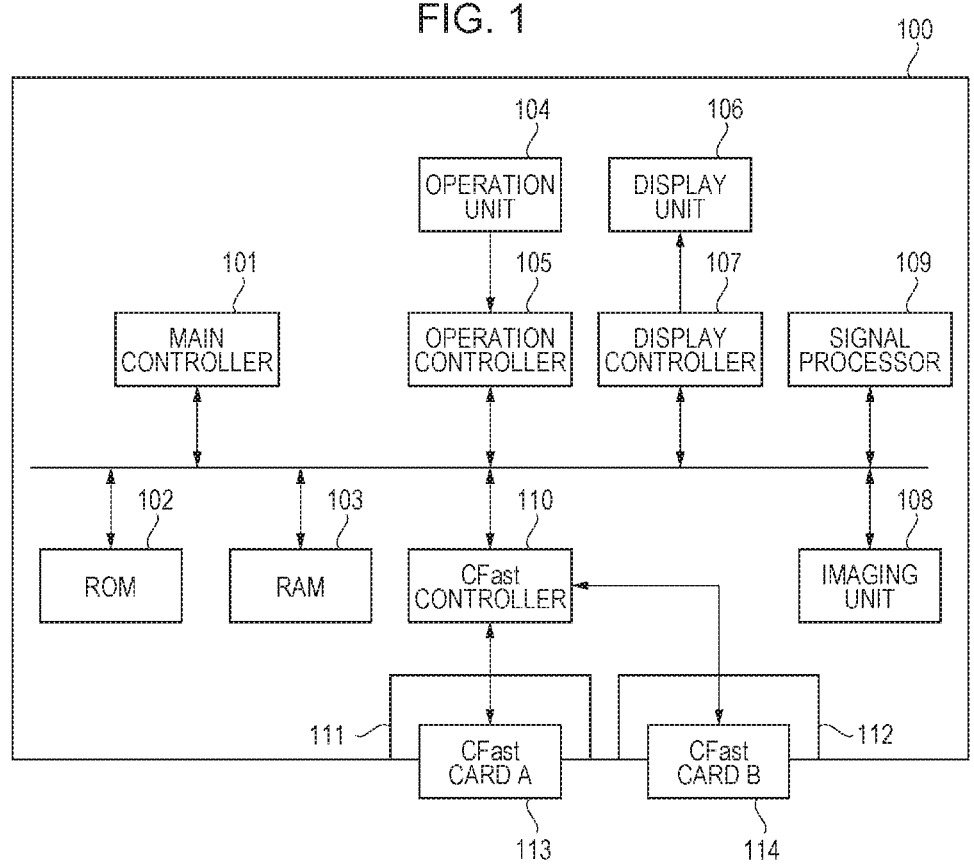
FIG. 1 is a diagram schematically illustrating a configuration of a digital still camera.

FIG. 1 is a diagram schematically illustrating a configuration of the digital still camera 100.

The digital still camera 100 includes a main controller 101, a read only memory (ROM) 102, a random access memory (RAM) 103, an operation unit 104, an operation controller 105, a display unit 106, a display controller 107, an imaging unit 108, a signal processor 109, and a CFast controller 110. Furthermore, the digital still camera 100 includes an attachment unit A (hereinafter referred to as a "slot A 111") and an attachment unit B (hereinafter referred to as a "slot B 112"). Memory cards, that is, a CFast card A 113 and a CFast card B 114, are attached to the slot A 111 and the slot B 112, respectively.

The main controller 101 is a computer which controls the various units included in the digital still camera 100 based on programs stored in the ROM 102, information stored in the RAM 103, information supplied from the operation controller 105, and the like.

The main controller 101 performs a current-temperature obtaining process of obtaining information on a current temperature of a memory card. This process corresponds to an example of a process performed by an obtaining unit. Specifically, the main controller 101 obtains information on current temperatures of the CFast card A 113 and the CFast card B 114 measured by the CFast card A 113 and the CFast card B 114, respectively, through the CFast controller 110. For example, the main controller 101 may obtain the information on current temperatures by a self-monitoring analysis and reporting technology (S.M.A.R.T.) command. The main controller 101 stores the obtained information on the current temperatures in the RAM 103.

The main controller 101 further performs a medium-information obtaining process of obtaining medium information of the memory card. Specifically, the main controller 101 obtains CFast information (medium information) including a maker, a model number, an operation guaranteed temperature, and a temperature-velocity correlation table from the CFast card A 113 and the CFast card B 114 through the CFast controller 110. The main controller 101 stores the obtained CFast information in the RAM 103.

Furthermore, the main controller 101 performs a condition determination process of determining whether information on a current temperature of a memory card satisfies a predetermined condition or determining whether a bit rate obtained when an image is recorded satisfies a predetermined condition.

The main controller 101 performs a display control process of controlling display associated with a temperature of the memory card. This process corresponds to an example of a process performed by a display control unit. Specifically, the main controller 101 controls display associated with temperatures of the CFast card A 113 and the CFast card B 114 through the display controller 107 based on a result of the condition determination process.

Furthermore, the main controller 101 performs a state determination process of determining an operation state of the digital still camera 100. Specifically, the main controller 101 determines an operation state of the digital still camera 100 from among various operation states including a state in which switching of a recording destination is being performed, a state in which a recording start process is being performed, a state in which recording is being performed, a state in which a recording stop process is being performed, and a state in which recording is stopped through the CFast controller 110.

The ROM 102 is a nonvolatile memory which stores information including programs to be executed by the main controller 101, icon images, on-screen display (OSD) data, the temperature-velocity correlation tables, and fixed values.

The RAM 103 is a volatile memory which temporarily stores information including a current temperature (information on a current temperature), CFast information, a display state of the high-temperature icon, a set bit rate, and a threshold value. The display state of the high-temperature icon is information indicating whether the high-temperature icon is being displayed. The set bit rate is used when an image is recorded in the memory card. The main controller 101 determines the set bit rate in accordance with a recording setting set by a user, such as image quality (resolution, a compression rate, and a frame rate) of an image to be captured by the imaging unit 108 under control of the main controller 101, or a selection by the user and stores the set bit rate in the RAM 103. The threshold value is used when a determination as to whether the predetermined condition is satisfied. Examples of the threshold value include an alert temperature threshold value, an erasing temperature threshold value, and an alert bit rate threshold value described below.

The operation unit 104 includes a power switch, a button for instructing start/stop of imaging, a mode switch for performing switching between an imaging mode and a reproducing mode, a button for performing switching between index reproduction and single reproduction, a menu setting button for setting simultaneous recording and proxy recording, and a touch panel. The switches and the buttons in the operation unit 104 are not limited to physically configured switches and buttons, and may be buttons or knobs displayed on the display unit 106, such as a touch panel.

The operation controller 105 transmits operation information to the main controller 101 in accordance with a signal supplied from the operation unit 104.

Examples of the display unit 106 include a liquid crystal panel and an electronic view finder of a look-in type (an eyepiece type).

The display controller 107 displays an image captured by the imaging unit 108 and a temperature of the memory card in the display unit 106 in response to an instruction issued by the main controller 101.

The imaging unit 108 is used to input an image to be recorded in the memory card into the digital still camera 100 and outputs data on an image obtained by capturing an object to the signal processor 109 or the like.

The signal processor 109 encodes image data input from the imaging unit 108 before recording the image data in the memory card.

The CFast controller 110 controls operation of the attached CFast card A 113 and operation of the attached CFast card B 114. Specifically, the CFast controller 110 records image data and management information in the CFast card A 113 and the CFast card B 114. Furthermore, the CFast controller 110 obtains information on current temperatures and CFast information from the CFast card A 113 and the CFast card B 114. Furthermore, the CFast controller 110 detects attachment/detachment of the CFast card A 113 and the CFast card B 114 relative to the slot A 111 and the slot B 112, respectively.

The CFast card A 113 and the CFast card B 114 are flash memory cards which may be randomly accessed and which have physical high-speed serial interfaces. Note that any other recording media, such as solid state drives (SSDs) and hard disk drives (HDDs), may be used instead of the CFast cards as long as information on a current temperature is obtained.

Note that the CFast controller 110 determines a recording destination of an image in accordance with an operation performed by a user through the operation unit 104. Specifically, the CFast controller 110 determines whether the CFast card A 113 attached to the slot A 111 or the CFast card B 114 attached to the slot B 112 is used as the recording destination or whether both of the CFast card A 113 and the CFast card B 114 are used as the recording destinations (one of them is used for backup). Furthermore, the CFast controller 110 may switch the recording destination to the CFast card A 113 attached to the slot B 112 when the recording destination is the CFast card A 113 attached to the slot A 111. Conversely, the CFast controller 110 may switch the recording destination to the CFast card A 113 attached to the slot A 111 when the recording destination is the CFast card B 114 attached to the slot B 112.

Next, information stored in the RAM 103 and the ROM 102 will be described.

Figure 2:
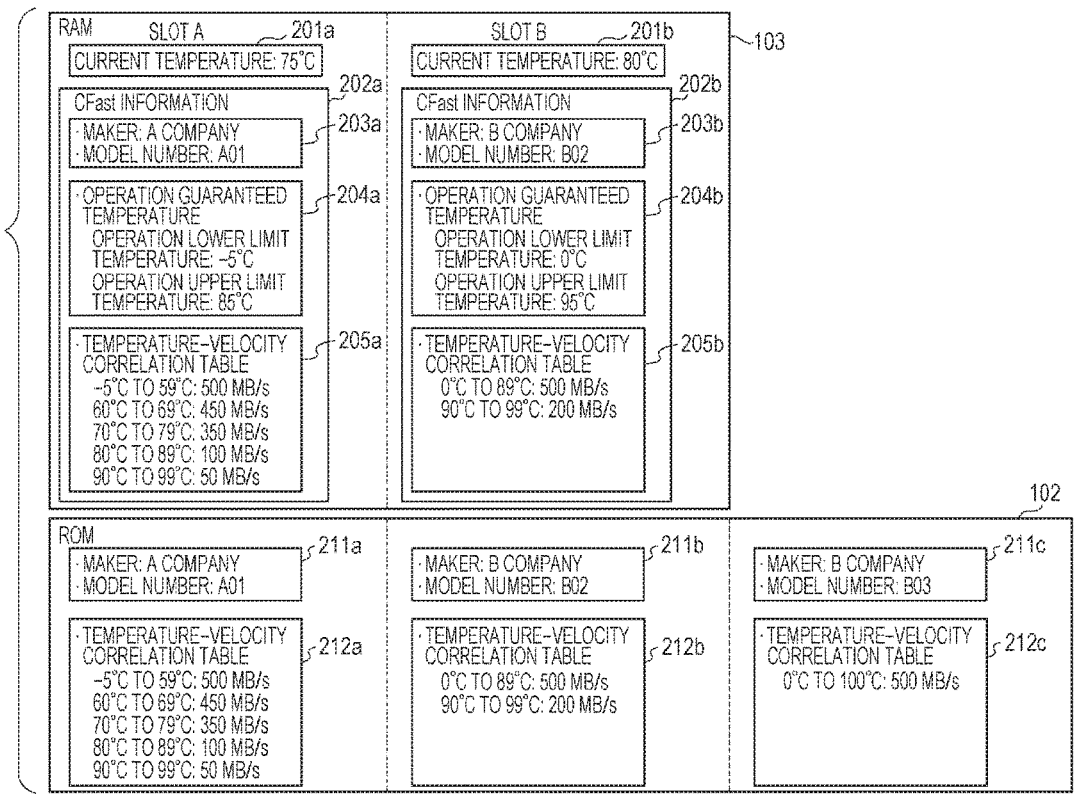
FIG. 2 is a diagram schematically illustrating an example of information stored in the digital still camera.

FIG. 2 is a diagram illustrating an example of the information stored in the RAM 103 and the ROM 102.

The RAM 103 temporarily stores current temperatures 201a and 201b, CFast information 202a and 202b. It is assumed here that the current temperature 201a and the CFast information 202a are obtained from the CFast card A 113 attached to the slot A 111. On the other hand, the current temperature 201b and the CFast information 202b are obtained from the CFast card B 114 attached to the slot B 112. Note that the current temperatures 201a and 201b may be information represented by Celsius, Fahrenheit, or a temperature zone.

The CFast information 202a and 202b includes identification information 203a and 203b which include makers and model numbers, information on operation guaranteed temperatures 204a and 204b, and information on temperature-velocity correlation tables 205a and 205b, respectively.

The makers included in the identification information 203a and 203b are information on manufacturers of the memory cards or the like, and may be stored as character strings of maker's names or abstracted information, such as maker IDs. The model types included in the identification information 203a and 203b are information on model types of the memory cards or the like, and may be stored as character strings or information, such as model IDs.

The operation guaranteed temperatures 204a and 204b are information including an operation lower limit temperature and an operation upper limit temperature, and may be stored as Celsius, Fahrenheit, or a temperature zone.

The temperature-velocity correlation tables 205a and 205b indicate data groups representing correlations between temperatures of the memory cards and recordable bit rates and are used to obtain a recordable bit rate in accordance with information on a current temperature. The temperature-velocity correlation tables 205a and 205b store recordable bit rates associated with certain temperature ranges.

The ROM 102 stores the identification information 211a to 211c and temperature-velocity correlation tables 212a to 212c which are associated with the identification information 211a to 211c, respectively. The information stored in the ROM 102 is not obtained from the memory cards but stored in advance. The temperature-velocity correlation tables 212a to 212c are used to obtain a recordable bit rate from information on a current temperature similarly to the temperature-velocity correlation tables 205a and 205b stored in the RAM 103. The main controller 101 obtains identification information including a maker and a model number from an attached memory card and determines one of the temperature-velocity correlation tables 212a to 212c corresponding to the identification information 211a to 211c which matches the identification information as a table for obtaining a recordable bit rate. Although the three identification information pieces and the three temperature-velocity correlation tables are stored in the ROM 102, the numbers of the types of identification information pieces and the number of temperature-velocity correlation tables are not limited to three. For example, the number of identification information pieces and the number of temperature-velocity correlation tables corresponding to the number of types of fabricated memory cards may be stored in the ROM 102.

Figure 3A:
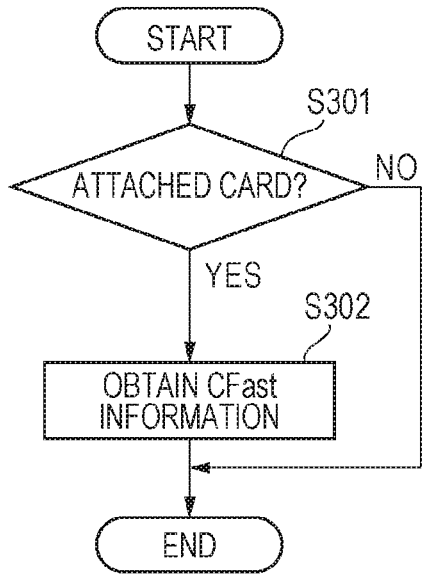
FIGS. 3A to 3C are flowcharts illustrating processes according to a first embodiment.
Figure 3B:
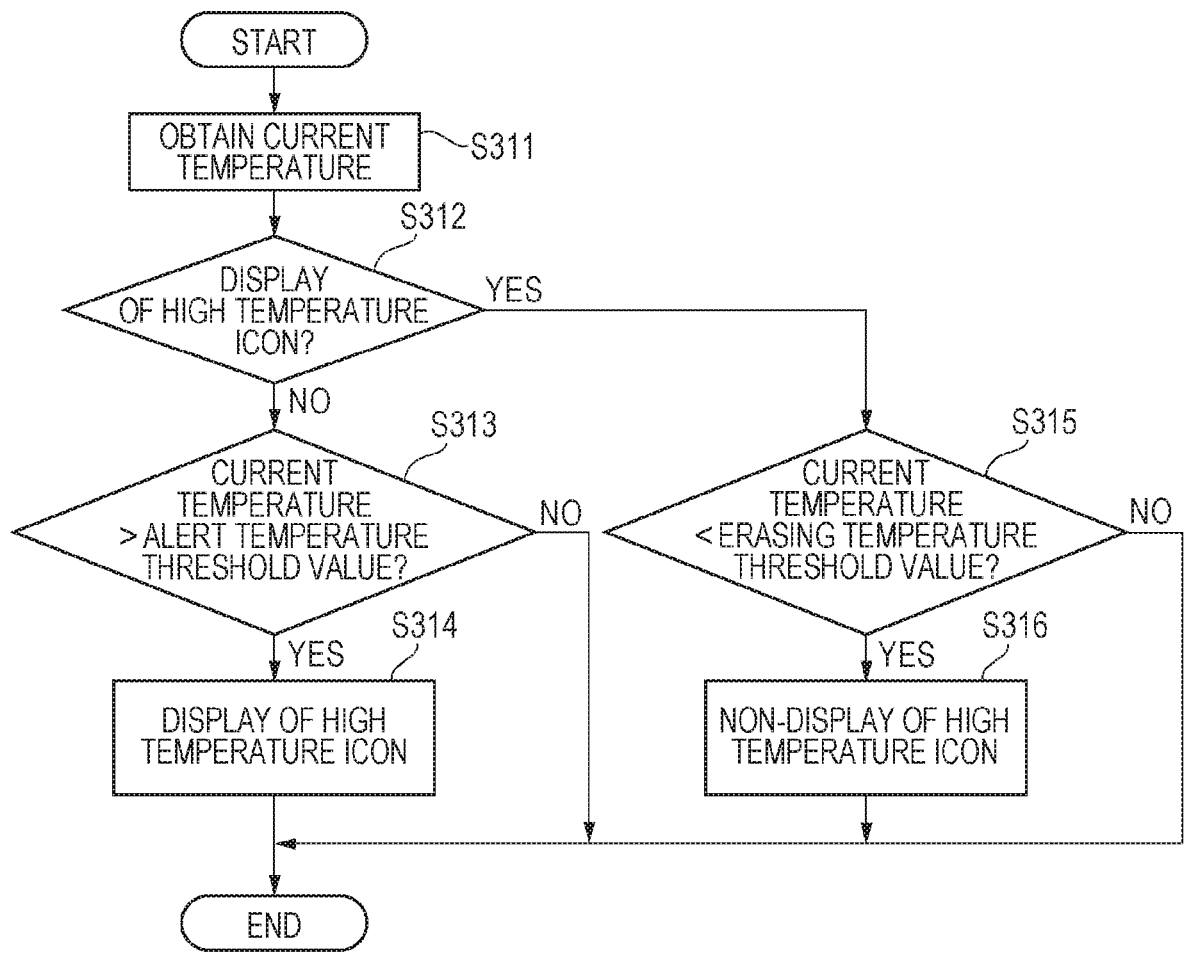
Figure 3C:
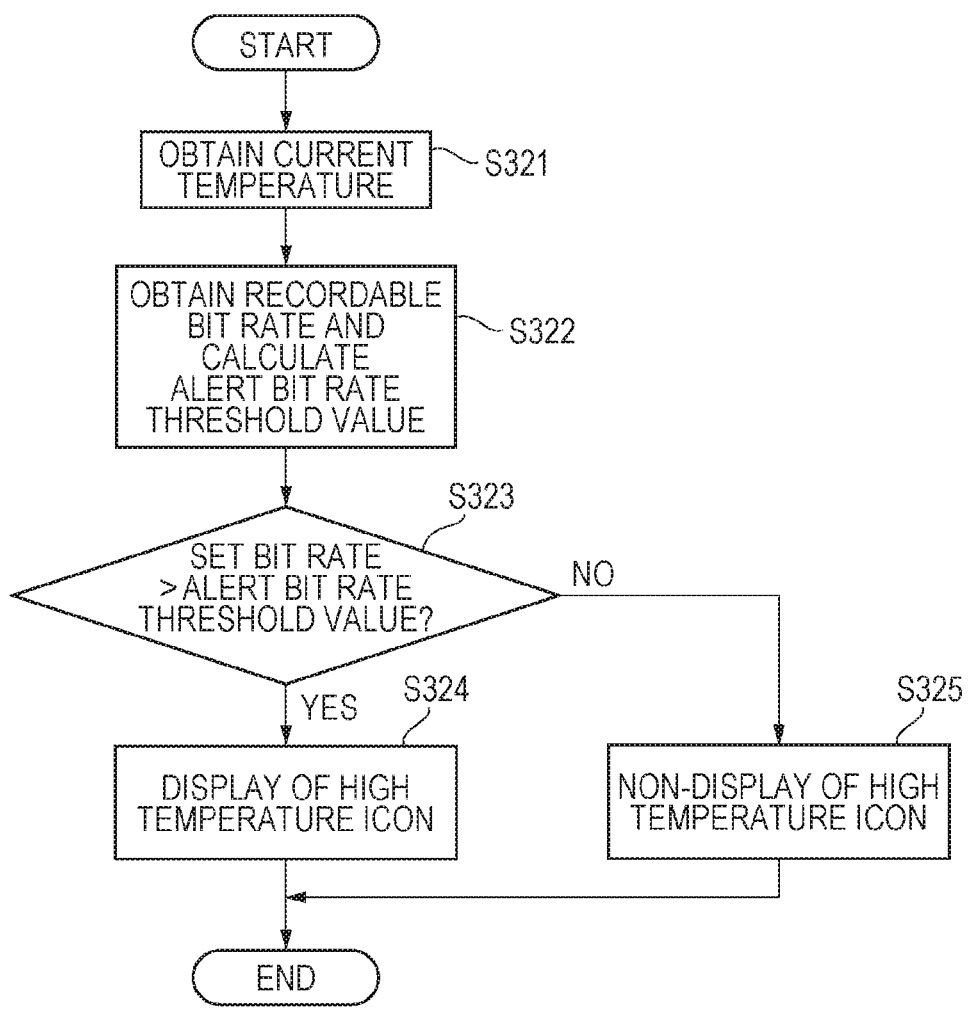

Next, operation of the digital still camera 100 of this embodiment will be described with reference to flowcharts of FIGS. 3A to 3C. The flowcharts of FIGS. 3A to 3C are realized when the main controller 101 develops the programs stored in the ROM 102 in the RAM 103 and executes the programs.

Here, three patterns will be described.

As a first pattern, a temperature of a memory card is displayed based on information on a current temperature obtained from the memory card and an operation upper limit temperature (hereinafter referred to as a "pattern 1"). Specifically, the pattern 1 corresponds to a case where the operation guaranteed temperatures 204a and 204b stored in the RAM 103 are used.

As a second pattern, a temperature of a memory card is displayed based on information on a current temperature obtained from the memory card and a temperature-velocity correlation table (hereinafter referred to as a "pattern 2"). Specifically, the pattern 2 corresponds to a case where the temperature-velocity correlation tables 205a and 205b stored in the RAM 103 are used.

As a third pattern, a temperature of a memory card is displayed based on information on a current temperature obtained from the memory card and a temperature-velocity correlation table stored in advance (hereinafter referred to as a "pattern 3"). Specifically, the pattern 3 corresponds to a case where the temperature-velocity correlation tables 212a to 212c stored in the ROM 102 are used.

The flowchart in FIG. 3A is executed in common in the patterns 1 to 3.

The flowchart in FIG. 3B is executed in the pattern 1. The flowchart in FIG. 3C is executed in the patterns 2 and 3. Even in the same flowchart, when different processes are performed in different patterns, a corresponding one of the processes is described in each of the patterns. Note that the flowcharts in FIGS. 3A to 3C are executed on both the CFast card A 113 attached to the slot A 111 and the CFast card B 114 attached to the slot B 112.

A process in the flowchart in FIG. 3A is periodically executed by the main controller 101. In step S301, the main controller 101 determines whether a CFast card has been attached. Specifically, the main controller 101 determines that a CFast card has been attached to a slot to be processed when receiving information on a detection of attachment of the CFast card into the slot from the CFast controller 110. When a CFast card has been attached, the process proceeds to step S302. On the other hand, when a CFast card has not been attached or when it is determined that a CFast card has been attached in a preceding determination, the process is terminated.

In step S302, the main controller 101 executes a medium information obtaining process. Specifically, the main controller 101 obtains CFast information from the CFast card attached to the slot to be processed and stores the obtained CFast information associated with the slot to be processed in the RAM 103.

Here, the identification information 203a and 203b and the information on the operation guaranteed temperatures 204a and 204b are stored in the RAM 103 in all the patterns 1 to 3. However, the information on the temperature-velocity correlation tables 205a and 205b is additionally stored in the RAM 103 only in the pattern 2. A process in the flowchart in FIG. 3B is periodically executed by the main controller 101 in the pattern 1. This process is executed in a case where the digital still camera 100 is in a recording waiting state (during display of a live-view image) or in a state in which an image is being recorded in the imaging mode. Specifically, this process is not executed in an operation mode in which it is unlikely that recording is newly performed, such as the reproducing mode. Note that the process may be executed in the other operation modes including the reproducing mode.

In step S311, the main controller 101 executes a current-temperature obtaining process. Specifically, the main controller 101 obtains information on a current temperature of the CFast card attached to the slot to be processed and stores the obtained information on the current temperature associated with the slot to be processed in the RAM 103.

In step S312, the main controller 101 determines whether the high-temperature icon has been displayed in the display unit 106 for the CFast card attached to the slot to be processed. The main controller 101 determines whether the high-temperature icon has been displayed based on a high-temperature icon display state stored in the RAM 103. When the high-temperature icon has not been displayed, the process proceeds to step S313, whereas when the high-temperature icon has been displayed, the process proceeds to step S315.

In step S313, the main controller 101 compares the information on the current temperature with an alert temperature threshold value (a first temperature threshold value) so as to determine whether the information on the current temperature is higher than the alert temperature threshold value. Here, the alert temperature threshold value is used to determine whether the high-temperature icon (alert) is to be displayed. The alert temperature threshold value is equal to or smaller than the operation guaranteed temperature (the operation upper limit temperature in this case), that is, the alert temperature threshold value is equal to the operation guaranteed temperature or is lower than the operation guaranteed temperature by a certain value. Accordingly, the main controller 101 sets the obtained operation guaranteed temperature as the alert temperature threshold value as it is or calculates the alert temperature threshold value by subtracting a certain value from the operation guaranteed temperature and stores the obtained alert temperature threshold value in the RAM 103. This process corresponds to an example of a process performed by a calculation unit.

When the information on the current temperature is higher than the alert temperature threshold value, the process proceeds to step S314, whereas when the information on the current temperature is equal to or lower the alert temperature threshold value, the process is terminated.

In step S314, the main controller 101 displays the high-temperature icon for the CFast card attached to the slot to be processed in the display unit 106 and updates the high-temperature icon display state by information indicating that the high-temperature icon is being displayed.

Figure 4A:
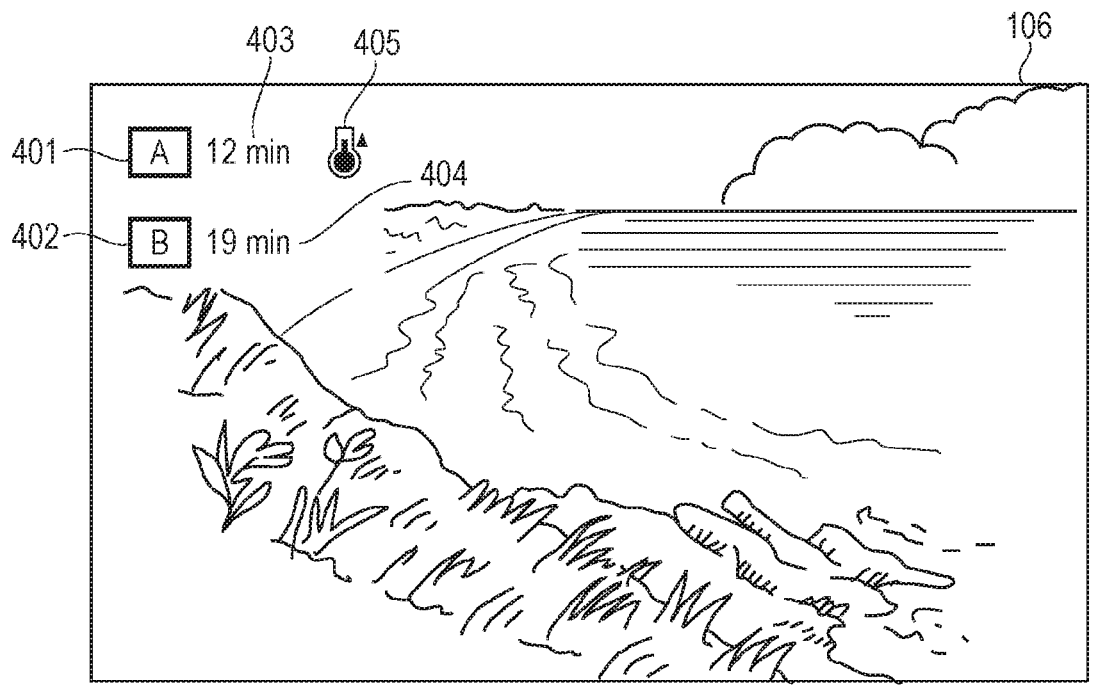
FIGS. 4A and 4B are diagrams illustrating examples of display according to the first embodiment.

FIG. 4A is a diagram illustrating an example of display of a high-temperature icon 405 in the display unit 106. In FIG. 4A, an icon 401 indicating a CFast card A, an icon 402 indicating a CFast card B, a recordable time 403 of the CFast card A, and a recordable time 404 of the CFast card B are displayed such that they overlap on a live-view image.

In FIG. 4A, the high-temperature icon 405 is displayed in the vicinity of the icon 401 indicating the CFast card A. Specifically, information indicating the memory card (the icon 401 indicating the CFast card A) and a display item (the high-temperature icon 405) indicating increase in temperature are displayed in association with each other. However, the high-temperature icon is not displayed in the vicinity of the icon 402 indicating the CFast card B.

Therefore, the user may recognize that the CFast card A is in high temperature, and therefore, images (particularly moving images or still images serially captured) may not be further recorded if the recording destination is the slot A, and that the CFast card B is not in high temperature. Accordingly, the user may perform switching of the recording destination of an image to the CFast card B attached to a slot B or detaches the CFast card A attached to a slot A so as to replace the CFast card A by another memory card which is not in high temperature.

Figure 4B:
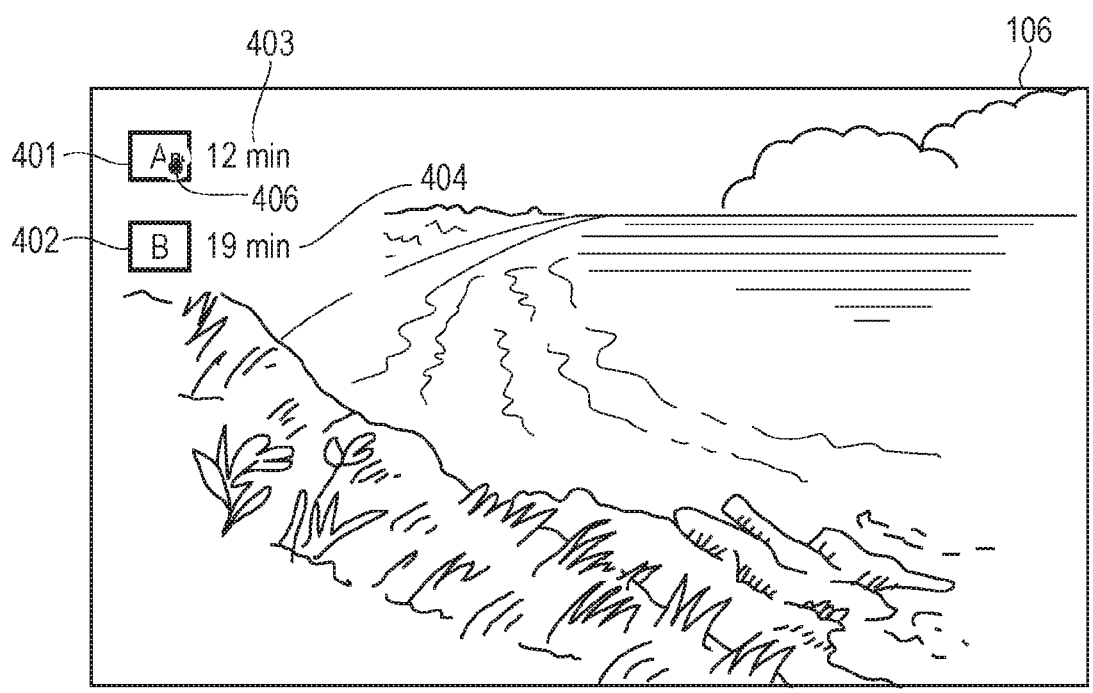

FIG. 4B is a diagram illustrating an example of display of a high-temperature icon 406 in the display unit 106. In FIG. 4B, the high-temperature icon 406 is displayed in the vicinity of the icon 401 indicating the CFast card A in an overlapping manner. Specifically, the icon 401 indicating the CFast card A and the high-temperature icon 406 which are associated with each other are displayed. The high-temperature icon 406 illustrated in FIG. 4B is designed as a small size relative to the high-temperature icon 405 illustrated in FIG. 4A.

Note that the temperature of the CFast card is displayed so that the user may recognize the temperature of the CFast card in any case in addition to the case where alert is generated for a temperature by an icon. For example, a message "a temperature of a card attached to the slot A is high" or the like may be displayed and a display mode may be changed by a method for changing a color of the icon 401 indicating the CFast card A.

On the other hand, when it is determined that the high-temperature icon is being displayed in step S312, the process proceeds to step S315 where the main controller 101 compares the current temperature information with the erasing temperature threshold value (a second temperature threshold value) so as not to display the high-temperature icon when the temperature of the CFast card is lowered. Here, the erasing temperature threshold value is used to determine whether the high-temperature icon is not to be displayed. When the erasing temperature threshold value is equal to the alert temperature threshold value, display and non-display of the high-temperature icon are frequently switched from one to another and visibility becomes poor, and therefore, the erasing temperature threshold value is set smaller than the alert temperature threshold value.

The main controller 101 calculates the erasing temperature threshold value based on the alert temperature threshold value or the operation guaranteed temperature (the operation upper limit temperature). For example, the main controller 101 subtracts 10° C. from the alert temperature threshold value and stores a resultant value in the RAM 103 as the erasing temperature threshold value.

When the information on the current temperature is lower than the erasing temperature threshold value, the process proceeds to step S316, whereas when the information on the current temperature is equal to or higher than the erasing temperature threshold value, the process is terminated.

In step S316, the main controller 101 brings the high-temperature icon for the CFast card attached to the slot to be processed into a non-display state and updates the high-temperature icon display state by information indicating that the high-temperature icon is not displayed.

A process in the flowchart in FIG. 3C is periodically executed by the main controller 101 in the patterns 2 and 3. This process is executed in a case where the digital still camera 100 is in a recording waiting state or in a state in which an image is being recorded in the imaging mode.

In step S321, the main controller 101 executes a current-temperature obtaining process. This process is the same as the process performed in step S311.

In step S322, the main controller 101 obtains a recordable bit rate and calculates an alert bit rate threshold value using the obtained recordable bit rate.

Here, in the case of the pattern 2, the main controller 101 obtains a recordable bit rate corresponding to current temperature information using the temperature-velocity correlation tables 205a and 205b stored in the RAM 103. For example, in a case where a current temperature of the CFast card A 113 is 75° C., the main controller 101 obtains a recordable bit rate 350 MB/s from the temperature-velocity correlation table 205a. For example, in a case where a current temperature of the CFast card B 114 is 80° C., the main controller 101 obtains a recordable bit rate 500 MB/s from the temperature-velocity correlation table 205b.

In the case of the pattern 3, the main controller 101 extracts one of the temperature-velocity correlation tables 212a to 212c stored in the ROM 102 which corresponds to identification information which matches identification information (a maker and a model number) of CFast information stored in the RAM 103. The main controller 101 obtains a recordable bit rate corresponding to the current temperature information from the extracted temperature-velocity correlation table. In a case where information on a maker and a model number which are obtained from the CFast card A 113 and stored in the RAM 103 indicate A company and A01, respectively, for example, the main controller 101 specifies the matched identification information 211a from among the identification information 211a to 211c stored in the ROM 102. Then the main controller 101 extracts the temperature-velocity correlation table 212a associated with the specified identification information 211a. Subsequently, the main controller 101 obtains a recordable bit rate of 350 MB/s corresponding to the current temperature of 75° C. of the CFast card A 113 from the temperature-velocity correlation table 212a. Furthermore, in a case where information on a maker and a model number which are obtained from the CFast card B 114 and stored in the RAM 103 indicate B company and B02, respectively, the main controller 101 specifies the matched identification information 211b among the identification information 211a to 211c stored in the ROM 102. Then the main controller 101 extracts the temperature-velocity correlation table 211b associated with the specified identification information 212b. Subsequently, the main controller 101 obtains a recordable bit rate of 500 MB/s corresponding to the current temperature of 80° C. of the CFast card B 114 from the temperature-velocity correlation table 212b.

Thereafter, the main controller 101 calculates an alert bit rate threshold value using the obtained recordable bit rate. Here, the alert bit rate threshold value is used to determine whether the high-temperature icon (alert) is to be displayed. The alert bit rate threshold value is not less than the recordable bit rate, that is, the alert bit rate threshold value is equal to the recordable bit rate or larger than the recordable bit rate by a certain value. The main controller 101 sets the obtained recordable bit rate as the alert bit rate threshold value as it is or calculates the alert bit rate threshold value by adding a certain value to the recordable bit rate and stores the alert bit rate threshold value in the RAM 103. This process corresponds to an example of a process performed by a calculation unit.

In step S323, the main controller 101 compares the set bit rate with the alert bit rate threshold value. The set bit rate is used to record an image into a CFast card as described above. The set bit rate is compared with the alert bit rate threshold value since an image may not be further recorded if the set bit rate is larger than the alert bit rate threshold value.

When the set bit rate is larger than the alert bit rate threshold value, the process proceeds to step S324, whereas when the set bit rate is equal to or smaller than the alert bit rate threshold value, the process proceeds to step S325.

In step S324, the main controller 101 displays the high-temperature icon for the CFast card attached to the slot to be processed in the display unit 106 and updates the high-temperature icon display state by information indicating that the high-temperature icon is being displayed. This process is the same as that in step S314. Therefore, the user may recognize that an image may not be further recorded if the slot to be processed remains as a recording destination.

On the other hand, in step S325, the main controller 101 does not display the high-temperature icon for the CFast card attached to the slot to be processed. Note that, if the high-temperature icon is being displayed, the main controller 101 brings the displayed high-temperature icon into a non-display state and updates the high-temperature icon display state by information indicating that the high-temperature icon is not displayed.

In this way, according to this embodiment, the display of a temperature of a memory card is controlled based on temperature information of the memory card, and therefore, the user may recognize the information on the temperature of the memory card. Accordingly, when the temperature information of the memory card indicates high temperature, the user may recognize that image recording may not be further performed, and therefore, the user may cope with this situation by recording images in another memory card or by reducing image equality of the images to be recorded, for example. In particular, in a case where an image captured by the imaging unit 108 is to be recorded by the digital still camera 100, loss of imaging opportunity may be prevented if the user copes with such a situation before image recording is not further performed.

Furthermore, according to the pattern 1 of this embodiment, the display of the temperature of the memory card is controlled based on a result of a determination as to whether information on the temperature of the memory card satisfies a predetermined condition, that is, a determination as to whether the information on the temperature of the memory card exceeds a threshold value. Accordingly, the main controller 101 may determine whether the temperature of the memory card is high with comparative ease.

Furthermore, according to the patterns 2 and 3 of this embodiment, the display of the temperature of the memory card is controlled based on a result of a determination as to whether a bit rate used when an image is recorded in the memory card satisfies a predetermined condition, that is, a determination as to whether the bit rate of the memory card exceeds a threshold value. This threshold value is changed depending on the temperature of the memory card, and therefore, the main controller 101 may determine a case where image recording is not further performed with comparative high accuracy.

Although the case where the operation guaranteed temperature is not stored in the ROM 102 is described in this embodiment, the operation guaranteed temperature may be stored in the ROM 102 similarly to the RAM 103. In this case, the main controller 101 may calculate the alert temperature threshold value and the erasing temperature threshold value using the operation guaranteed temperature stored in the ROM 102 instead of obtainment of the operation guaranteed temperature from the memory card.

Second Embodiment

In a second embodiment, a case where control is performed such that display of a temperature of a memory card is changed in accordance with an operation state of a digital still camera 100 will be described. Note that descriptions of configurations and processes which are the same as those of the first embodiments are omitted where appropriate.

As with the first embodiment, this embodiment also has patterns 1 to 3. However, the pattern 1 for displaying a temperature of a memory card based on current temperature information of the memory card and an operation upper limit temperature will be described as an example. Note that difference points between the pattern 1 and the other patterns 2 and 3 are the same as those described in the first embodiment, and therefore, descriptions thereof are omitted.

In this embodiment, a main controller 101 detects an operation state of the digital still camera 100 and stores information on the detected operation state in a RAM 103. Examples of the operation state include an operation state in which a memory card to record an image is switched (hereinafter referred to as a "recording destination switching state") and an operation state in which image recording is started (hereinafter referred to as a "recording start processing state). The examples of the operation state further include an operation state in which an image is being recorded (hereinafter referred to as a "recording state"), an operation state in which an operation of stopping image recording is being performed (hereinafter referred to as a "recording stop processing state") and an operation state in which image recording is stopped (hereinafter referred to as a "recording stop state").

Next, operation of the digital still camera 100 of this embodiment will be described with reference to flowcharts of FIGS. 5A to 5E. The flowcharts of FIGS. 5A to 5E are realized when the main controller 101 develops programs stored in a ROM 102 in the RAM 103 and executes the programs.

Figure 5A:
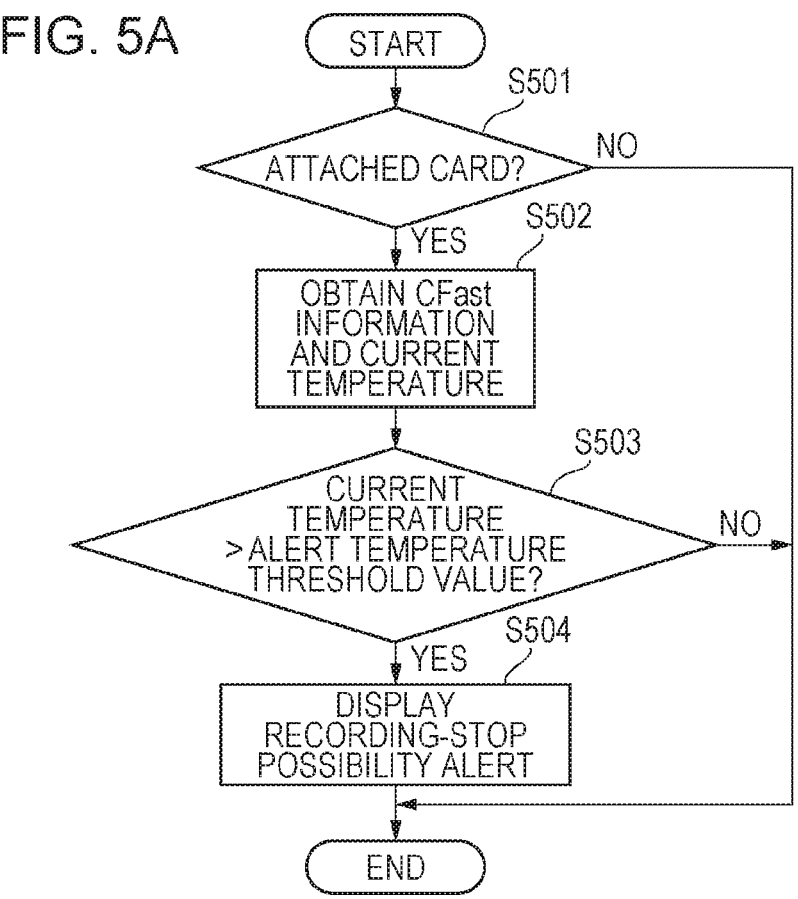
Figure 5B:
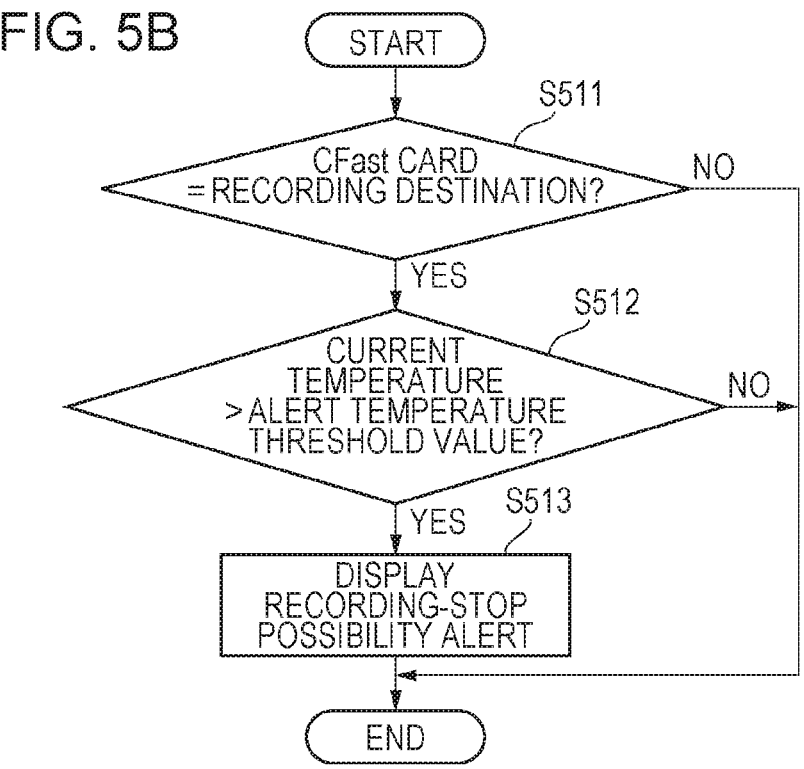
Figure 5D:
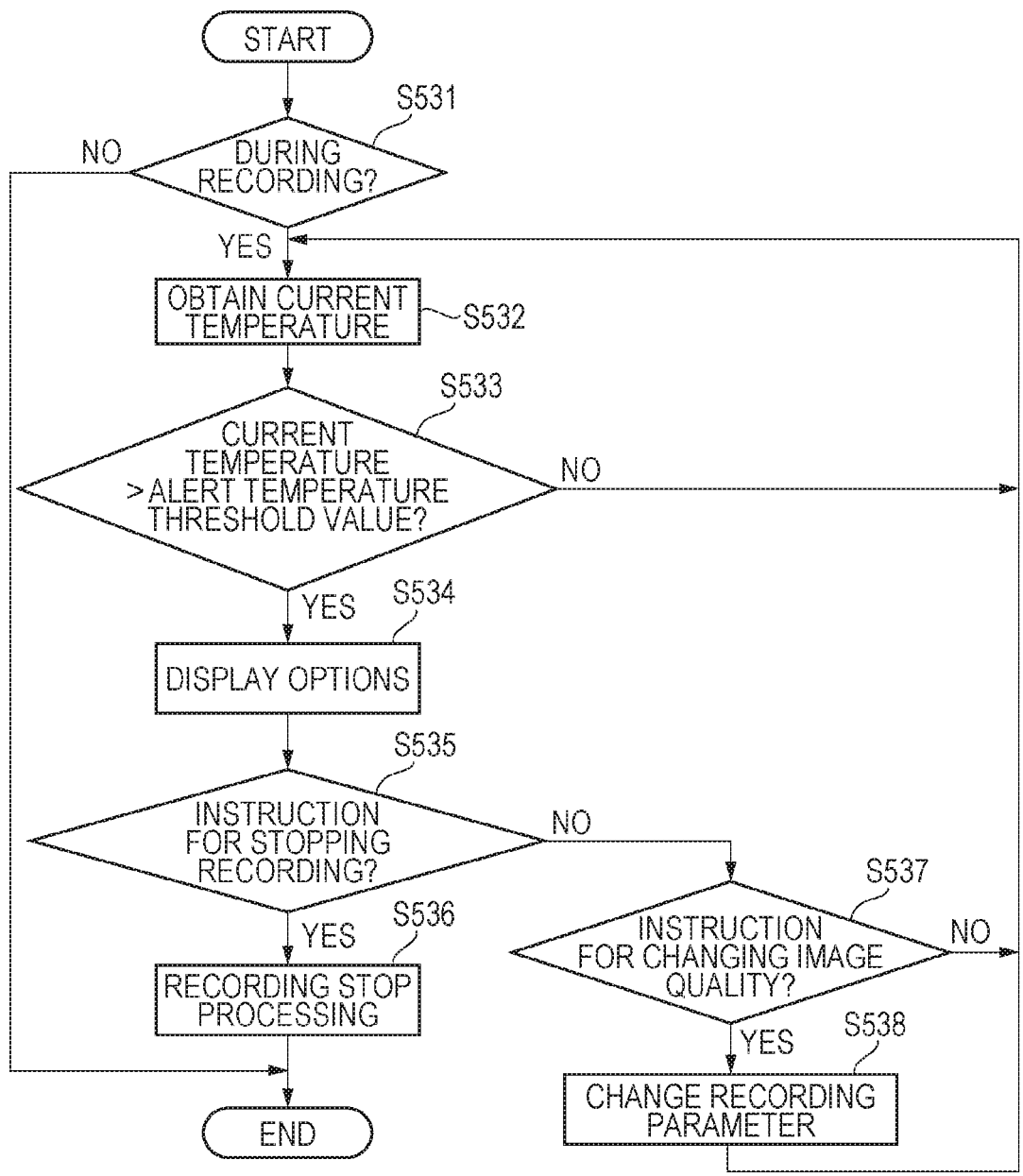
Figure 5E:
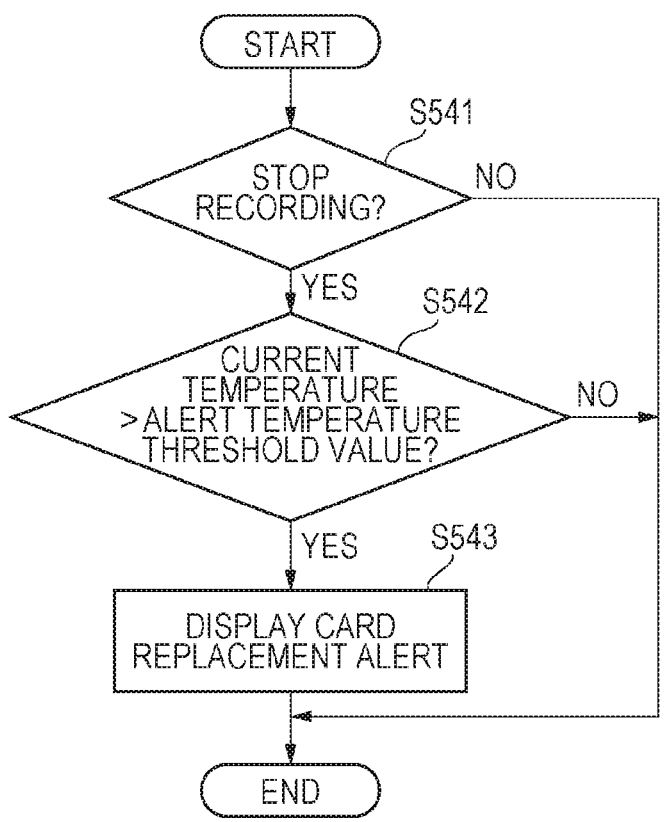

The flowchart of FIG. 5A is executed in the recording stop state. The flowchart of FIG. 5B is executed in the recording destination switching state. The flowchart of FIG. 5C is executed in the recording start processing state. The flowchart of FIG. 5D is executed in the recording state. The flowchart of FIG. 5E is executed in the recording stop processing state. Accordingly, the main controller 101 executes one of the flowcharts of FIGS. 5A to 5E in accordance with the stored operation state of the digital still camera 100.

Furthermore, the flowcharts in FIGS. 5A to 5E are executed on both of a CFast card A 113 attached to a slot A 111 and a CFast card B 114 attached to a slot B 112.

A process in the flowchart in FIG. 5A is periodically executed by the main controller 101 in the recording stop state.

In step S501, the main controller 101 determines whether a CFast card has been attached. This process is the same as that performed in step S301. When a CFast card has been attached, the process proceeds to step S502. On the other hand, when a CFast card has not been attached or when it is determined that a CFast card has been attached in a preceding determination, the process is terminated.

In step S502, the main controller 101 executes a medium information obtaining process and a current temperature obtaining process. These processes are the same as those performed in step S302 and step S311, respectively.

In step S503, the main controller 101 compares information on an obtained current temperature with an alert temperature threshold value so as to determine whether the information on the current temperature is higher than the alert temperature threshold value. This process is the same as that performed in step S313. When the information on the current temperature is higher than the alert temperature threshold value, the process proceeds to step S504. On the other hand, when the information on the current temperature is equal to or lower than the alert temperature threshold value, the process is terminated.

In step S504, the main controller 101 displays an alert message indicating that recording on a CFast card attached to a slot to be processed may be stopped in a display unit 106 for a certain period of time or until the user performs an input operation through an operation unit 104.

Figure 6A:
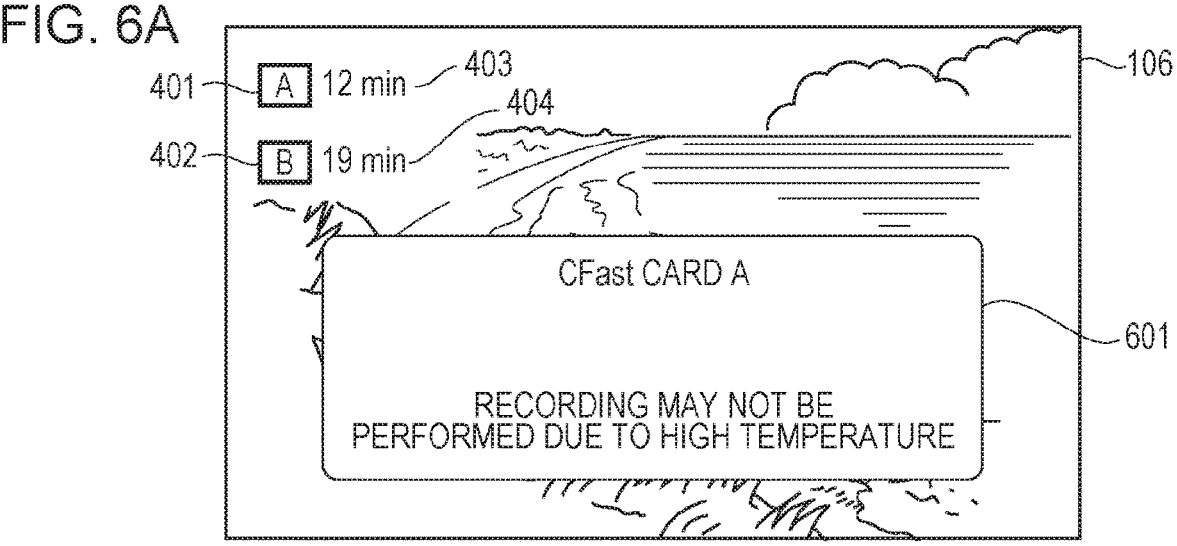
FIGS. 6A to 6C are diagrams illustrating examples of display according to the second embodiment.

FIG. 6A is a diagram illustrating an example of display of the alert message in the display unit 106. Note that display components which are the same as those of FIGS. 4A and 4B are denoted by reference numerals the same as those of FIGS. 4A and 4B, and descriptions thereof are omitted.

As illustrated in FIG. 6A, an alert message 601 is displayed on a live view image in an overlapping manner. The alert message 601 includes a character string "CFast card A" which specifies a memory card and a character string "Recording may not be performed due to high temperature" which is content of an alert.

Note that, as with the cases of FIGS. 4A and 4B, both of the high-temperature icon and the alert message 601 may be displayed, or only the high-temperature icon may be displayed. By this, the user may recognize that images may not be further recorded in an attached CFast card and may cope with this situation by recording images in another memory card where appropriate. Although omitted in the flowchart, as described in step S315 and step S316, the alert message 601 is brought into a non-display state when a temperature of the memory card becomes equal to or smaller than the erasing temperature threshold value.

A process in the flowchart in FIG. 5B is periodically executed by the main controller 101 in the recording destination switching state.

In step S511, the main controller 101 determines whether a CFast card corresponds to an image recording destination. Specifically, the main controller 101 determines whether at least one of the CFast card A and the CFast card B has been selected as an image recording destination. When a CFast card is not the image recording destination or when it is determined that a CFast card has become the recording destination in a preceding determination, the process is terminated. On the other hand, when a CFast card is not the recording destination in the preceding determination and a CFast card corresponds to the recording destination in this determination, the process proceeds to step S512.

In step S512, the main controller 101 compares information on a current temperature with an alert temperature threshold value so as to determine whether the information on the current temperature is higher than the alert temperature threshold value. This process is the same as that performed in step S313. When the information on the current temperature is higher than the alert temperature threshold value, the process proceeds to step S513. On the other hand, when the information on the current temperature is equal to or lower than the alert temperature threshold value, the process is terminated.

In step S513, the main controller 101 displays an alert message indicating that recording on the CFast card attached to the slot to be processed may be stopped in the display unit 106. This process is the same as that performed in step S504. By this, the user may recognize that images may not be further recorded in the attached CFast card of a switched recording destination (a switching destination) and may cope with this situation by further switching a recording destination where appropriate.

Note that, in the case of step S513, if the user recognizes that the CFast card of the recording destination which is just switched is in high temperature, the CFast card may be switched to or replaced by another CFast card before content is actually recorded in the CFast card. In this way, content is prevented from being recorded in a large number of CFast cards in a distributed manner. Accordingly, this case is preferably informed to the user more securely, and the alert message is preferably displayed in addition to display of the high-temperature icon (or instead of display of the high-temperature icon). Specifically, different alerts are suitably generated depending on situations such that, when a recording medium is in high temperature in the recording stop state, only the high-temperature icon is displayed, and when a recording medium which is a new recording destination after switching of a recording destination is in high temperature, an alert which emphasizes the high temperature is displayed. The alert displayed in step S513 which is emphasized when compared with the high-temperature icon displayed in step S504 is not limited to the alert message. Other display methods may be employed including blinking display of the high-temperature icon, display of a high-temperature icon which is larger than the high-temperature icon displayed in step S504, display of an alert icon different from the high-temperature icon, and display of the high-temperature icon at a center of a screen.

A process in the flowchart in FIG. 5C is periodically executed by the main controller 101 in the recording start processing state.

In step S521, the main controller 101 determines whether image recording on a CFast card is to be started. When image recording is not to be started or when the image recording was started in a preceding determination, the process is terminated. On the other hand, when the image recording on a CFast card is not started in the preceding determination and the image recording on a CFast card is started this time, the process proceeds to step S522.

In step S522, the main controller 101 executes the current-temperature obtaining process. This process is the same as that performed in step S311. The main controller 101 updates current temperature stored in the RAM 103 by obtained current temperature information.

In step S523, the main controller 101 compares the obtained current temperature information with the alert temperature threshold value so as to determine whether the current temperature information is higher than the alert temperature threshold value. This process is the same as the process performed in step S313. When the current temperature information is higher than the alert temperature threshold value, the process proceeds to step S524. On the other hand, when the current temperature information is equal to or lower than the alert temperature threshold value, the process proceeds to step S525.

In step S524, the main controller 101 displays an alert message indicating that recording on the CFast card attached to the slot to be processed may be stopped in the display unit 106. This process is the same as that performed in step S504.

In step S525, the main controller 101 starts image recording on the CFast card.

Accordingly, the user may recognize that images may not be further recorded in the CFast card during the image recording performed on the CFast card and may cope with this situation by switching a recording destination where appropriate.

Note that, in the case of step S524, if the user does not recognize that the CFast card of the recording destination is in high temperature before the recording is started, the recording may be unintentionally stopped. Furthermore, a temperature of the recording medium is increased depending on a recording process, and therefore, it is highly likely that the recording may not be further performed if the recording is continued. Note that, even if the recording may not be further performed due to high temperature of the recording medium, an alert message is displayed but start of the recording is not prohibited since imaging opportunity may be missed unless the recording is immediately started.

On the other hand, the recording is not performed in the recording stop state, and therefore, the temperature of the CFast card may be usually reduced with time. Accordingly, emergency of the alert indicating the state in which the temperature is higher than that in a recording start time as illustrated in step S524 is low. Accordingly, different alerts are suitably performed depending on situations such that, when a recording medium is in high temperature in the recording stop state, only the high-temperature icon is displayed in step S504, and when a recording medium of a recording destination is in high temperature at a time when recording is started, an alert which emphasizes the high temperature is displayed in step S524. The alert displayed in step S524 which is emphasized when compared with the high-temperature icon displayed in step S504 is not limited to the alert message. Other display methods may be employed including blinking display of the high-temperature icon, display of a high-temperature icon which is larger than the high-temperature icon displayed in step S504, display of an alert icon different from the high-temperature icon, and display of the high-temperature icon at a center of a screen. Content of the alert in step S524 and content of the alert in step S513 may be different from each other.

Note that, in the case of step S524 as described above, it is highly likely that the recording is stopped if the recording is continued, and therefore, recording may be prohibited from being started instead of the alert. Specifically, in a case where the temperature information of the CFast card of the recording destination is higher than the alert temperature threshold value, the recording may not be started even if a recording start instruction is issued. Furthermore, an alert message indicating that the recording is not started since the CFast card is in high temperature or a guide for starting the recording by switching the recording destination to another recording medium or replacing the recording destination by another recording medium may be displayed.

A process in the flowchart in FIG. 5D is periodically executed by the main controller 101 in the recording state.

In step S531, the main controller 101 determines whether an image is being recorded in the CFast. When an image is not being recorded in the CFast, the process is terminated. On the other hand, when an image is being recorded in the CFast, the process proceeds to step S532.

In step S532, the main controller 101 executes a current-temperature obtaining process. This process is the same as that performed in step S311. The main controller 101 updates a current temperature stored in the RAM 103 by the obtained current temperature information.

In step S533, the main controller 101 compares the obtained current temperature information with the alert temperature threshold value so as to determine whether the current temperature information is higher than the alert temperature threshold value. This process is the same as that performed in step S313. When the current temperature information is higher than the alert temperature threshold value, the process proceeds to step S534. On the other hand, when the current temperature information is equal to or lower than the alert temperature threshold value, the process returns to step S532.

In step S534, the main controller 101 displays an alert message indicating that the CFast card of the recording destination is in high temperature, and in addition, displays options in the display unit 106.

Figure 6B:
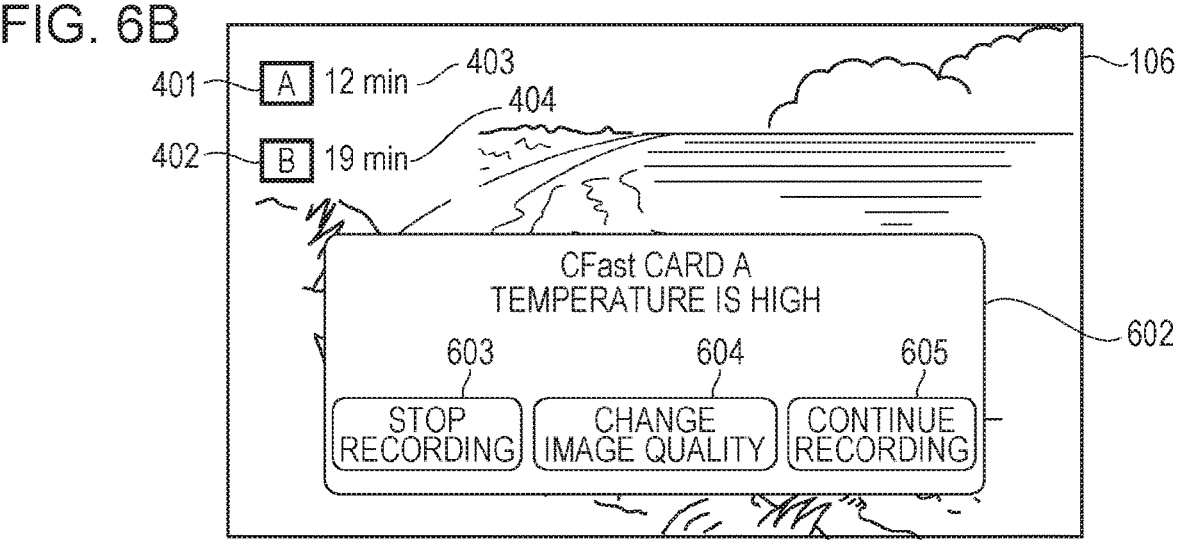

FIG. 6B is a diagram illustrating an example of the display of the alert message and the options in the display unit 106. An alert message 602 includes a character string "CFast card A" which specifies a memory card and a character string "Temperature is high" which is content of an alert. Furthermore, as the options, a recording stop button 603, an image quality change button 604, and a recording continuing button 605 are displayed.

In step S535, the main controller 101 determines whether stop of the image recording has been instructed. Specifically, the main controller 101 determines whether the user has selected the recording stop button 603 displayed in the display unit 106. A process of causing the user to select one of the options corresponds to an example of a process performed by a selection unit. When stop of the image recording has been instructed, the process proceeds to step S536, whereas when stop of the image recording has not been instructed, the process proceeds to step S537.

In step S536, the main controller 101 stops the image recording and terminates the process. Since the image recording is stopped, the CFast card is prevented from becoming in higher temperature.

In step S537, the main controller 101 determines whether change of quality of an image to be recorded has been instructed. Specifically, the main controller 101 determines whether the user has selected the image quality change button 604 displayed in the display unit 106. When change of quality of an image to be recorded has been instructed, the process proceeds to step S538.

In step S538, a recording parameter is changed so that a current set bit rate becomes small, and thereafter, images are continuously recorded in the CFast Card in the changed set bit rate. Thereafter, the process returns to step S532.

On the other hand, when change of quality of an image to be recorded has not been instructed in step S537, that is, when the recording continuing button 605 is selected so that continuation of the recording is instructed or when the instruction is not issued for a predetermined period of time, the alert message and the options are brought into a non-display state, and thereafter, images are continuously recorded in the CFast card in the current set bit rate. Here, it is more preferable that the high-temperature icon is displayed in a periphery of the screen such that the captured image is not prevented from being visibly recognized as described with reference to FIGS. 4A and 4B. Thereafter, the process returns to step S532.

Since the alert message and the options are displayed, the user may recognize that the image recording on the CFast card may be stopped and may select one of the options as a desired countermeasure. Note that, although the case where the three options are displayed is described in step S534, the present invention is not limited to this case and a number of the options may be omitted or other options may be added. For example, the main controller 101 may add a recording destination change button for changing a recording destination. In this case, the main controller 101 additionally displays a CFast card having current temperature information which is not larger than the alert temperature threshold value or having a set bit rate which is not larger than the alert bit rate threshold value in a selectable manner. Furthermore, instead of the display of the image quality change button 604, the image quality change button 604 may be displayed as a bit rate change button since the set bit rate is changed in accordance with a selection of the image quality change button 604.

A process in the flowchart in FIG. 5E is periodically executed by the main controller 101 in the recording stop processing state.

In step S541, the main controller 101 determines whether a process of stopping the recording in the CFast card is being performed. When the process of stopping the recording in the CFast card is not being performed or when it is determined that the process of stopping the recording in the CFast card has been performed in a preceding determination, the process is terminated. On the other hand, when it is determined that the process of stopping the recording in the CFast card is not being performed in the preceding determination and the process of stopping the recording in the CFast card is being performed in this determination, the process proceeds to step S542.

In step S542, the main controller 101 compares the obtained current temperature information with the alert temperature threshold value so as to determine whether the current temperature information is higher than the alert temperature threshold value. This process is the same as that performed in step S313. When the current temperature information is higher than the alert temperature threshold value, the process proceeds to step S543. On the other hand, when the current temperature information is equal to or lower than the alert temperature threshold value, the process is terminated.

In step S543, the main controller 101 displays an alert message indicating that replacement of the CFast card attached to the slot to be processed is performed in the display unit 106 for a certain period of time or until the user performs an input operation through an operation unit 104.

Figure 6C:
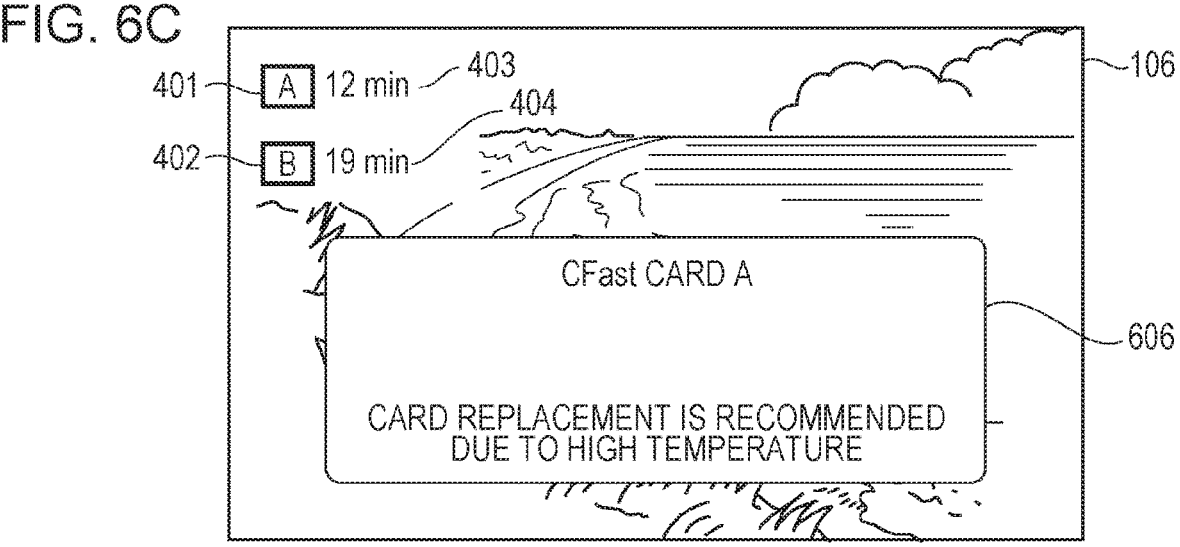

FIG. 6C is a diagram illustrating an example of display of the alert message in the display unit 106. An alert message 606 includes a character string "CFast card A" which specifies a memory card and a character string "Card replacement is recommended due to high temperature" which is content of the alert. The recording stop processing state is entered in response to a recording stop instruction issued by the user at a timing when required recording is temporarily terminated and an extension period may exist before next recording is started. When the recording medium is in high temperature, if the recording medium is replaced by one which is not in high temperature at this timing, it is less possible that imaging opportunity is missed due to replacement, and possibility that recording stop unintentionally occurs due to the high temperature of the recording medium at a time of next recording may be reduced.

The user may recognize that further recording of images in the CFast card is not preferable by the alert message 606 and the recording destination of the image may be switched where appropriated in a period in which possibility that the loss of the imaging opportunity is low.

As described above, according to this embodiment, the user may perform an appropriate response depending on the operation state by changing the display of the temperature of the memory card in accordance with the operation state of the digital still camera 100.

Furthermore, according to this embodiment, even a user who does not get used to perform operations may easily cope with a case where recording may not be performed on a memory card since the user may select a possible countermeasure when display associated with a temperature of a memory card is performed.

The present invention has been described with reference to the various embodiments. However, the present invention is not limited to these embodiments and various modifications may be made within the scope of the present invention and the embodiments described above may be appropriately combined with each other.

Although the case where the digital still camera 100 includes two slots as attachment units has been described in the first and second embodiments described above, the present invention is not limited to this and the digital still camera 100 may include only one slot or three or more slots.

Although the process performed when the temperature of the memory card is increased is described in the first and second embodiments described above, the embodiments are applicable to a case where alert is displayed when the temperature of the memory card is lowered and may become lower than the operation guaranteed temperature. In this case, a low-temperature icon and an alert message are displayed using various threshold values for low temperature (the high-low relationship thereof is reversed relative to the threshold values for high temperature) similarly to the threshold values for high temperature described in the first and second embodiments above.

Although the case where the display associated with the temperature of the memory card is performed on the display unit 106 included in the digital still camera 100 is described in the first and second embodiments, the present invention is not limited to this and the display may be performed on an external apparatus communicated with the digital still camera 100 in a wired manner or a wireless manner.

In the first and second embodiments described above, the main controller 101 may display, in addition to the high-temperature icon and the alert message, a time when the temperature of the memory card becomes equal to or smaller than the alert temperature threshold value or a time when the set bit rate becomes equal to or smaller than the alert bit rate threshold value. For example, a correlation table in which the temperature of the memory card and the time when the temperature becomes equal to or smaller than the alert temperature threshold value are associated with each other is stored in the ROM 102 for each current operation state. The main controller 101 extracts the correlation table corresponding to the current operation state, obtains the time when the temperature becomes equal to or smaller than the alert temperature threshold value corresponding to the current temperature information of the memory card from the extracted correlation table, and displays the time. Accordingly, the user may recognize the time when the possibility that the memory card to be processed may not be used for recording, and may cope with the situation by waiting for the time or by switching a recording destination.

Although the case where an image is recorded in the memory card is described in the first and second embodiments described above, the present invention is not limited to this and is applicable to a case where content other than an image is recorded.

Although the case where the recording medium is a CFast card serving as a memory card is described in the foregoing first and second embodiments, the present invention is not limited to this and the recording medium may be an SSD or an HDD.

The various control processes performed by the main controller 101 in the first and second embodiments described above may be performed by a single hardware section or the entire digital still camera 100 may be controlled by sharing the processes by a plurality of hardware sections.

Although the case where the present invention is applied to the digital still camera 100 is described as an example in the foregoing first and second embodiments, the present invention is not limited to this and is applicable to any recording apparatus as long as content may be recorded in the recording medium. Specifically, the present invention is applicable to a personal computer, a laptop personal computer, a personal digital assistance (PDA), a cellular phone terminal, a mobile image viewer, a smartphone, a tablet terminal, a digital photo frame, a music player, a game machine, a voice recorder, a moving-image recorder, and the like.

Other Embodiments

The present invention may be realized when programs which realize at least one of the functions of the foregoing embodiments are supplied to a system or an apparatus through a network or a recording medium and at least one processor included in the system or the apparatus reads and executes the programs. Furthermore, the present invention may be realized by a circuit (an application specific integrated circuit (ASIC), for example) which realizes at least one of the functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A recording apparatus which records content in a recording medium, the recording apparatus comprising:
    a controller configured to obtain information on a temperature of the recording medium; and
    a display controller configured to perform control such that display associated with the temperature of the recording medium is performed when the obtained temperature information satisfies a predetermined condition and a processing speed of recording of content on the recording medium satisfies a predetermined condition,
    wherein the display controller performs control such that display indicating the temperature of the recording medium is high is performed when the processing speed of recording of content on the recording medium is higher than a processing speed for the obtained temperature information.

2. The recording apparatus according to claim 1, further comprising:
    a plurality of attachment interfaces to which recording media are attached,
    wherein the display controller performs control such that the display associated with temperatures of the recording media is performed for individual recording media attached to the plurality of attachment interfaces in a state in which the recording media are associated with the temperatures.

3. The recording apparatus according to claim 1, wherein the controller is configured to obtain the information on a temperature of the recording medium measured by the recording medium from the recording medium.

4. The recording apparatus according to claim 3, wherein the controller is configured to obtain the temperature information by a self-monitoring analysis and reporting technology (S.M.A.R.T.) command.

5. The recording apparatus according to claim 1, wherein the display controller performs control such that display indicating that the temperature of the recording medium is high when the obtained temperature information is higher than a first threshold value.

6. The recording apparatus according to claim 5, wherein the first threshold value is based on an operation guaranteed temperature of the recording medium.

7. The recording apparatus according to claim 6, wherein the first threshold value is based on an operation guaranteed temperature of the recording medium obtained from the recording medium.

8. The recording apparatus according to claim 5, wherein the display controller performs control so as not to perform display indicating that the temperature of the recording medium is high when the obtained temperature information is lower than a second threshold value which is lower than the first threshold value.

9. The recording apparatus according to claim 1, wherein the display controller performs control so as not to perform display indicating that the temperature of the recording medium is high when the processing speed of recording of content on the recording medium is lower than the processing speed for the temperature information.

10. The recording apparatus according to claim 1, wherein the content is an image and the processing speed of recording of content on the recording medium is based on an image recording setting set by a user.

11. The recording apparatus according to claim 1, wherein the display controller performs control such that display associated with the temperature of the recording medium is performed based on the temperature information of the recording medium which is a recording destination obtained by the controller when recording of content is started.

12. The recording apparatus according to claim 1, wherein the display controller performs control such that display associated with the temperature of the recording medium is performed based on the temperature information of the recording medium which is a recording destination obtained by the controller during recording of content.

13. The recording apparatus according to claim 12, wherein the display controller performs control such that at least one of options including stop of recording of content, a change of a processing speed of recording, and continuance of the recording of the content is displayed when display associated with the temperature of the recording medium is performed during content recording.

14. The recording apparatus according to claim 1, wherein the display controller performs control such that display for prompting a user to change a processing speed of recording is performed when display associated with the temperature of the recording medium is performed.

15. A recording apparatus which records content in a recording medium, the recording apparatus comprising:
- a controller configured to obtain information on a temperature of the recording medium:
- a display controller configured to perform control such that display associated with the temperature of the recording medium is performed when the temperature information obtained by the obtaining unit satisfies a predetermined condition; and
- a plurality of attachment interfaces to which recording media are attached, wherein the display controller performs control such that display associated with a temperature of one of the recording media is performed based on temperature information of the recording medium which is a switching destination obtained by the controller when a recording medium to which content is to be recorded is switched.

16. The recording apparatus according to claim 15, wherein the display controller emphasizes, when compared with a case where content is not being recorded, display associated with the temperature of the recording medium in a case where the temperature of the recording medium is displayed when a recording medium to which content is to be recorded is switched.

17. A method for controlling a recording apparatus which records content in a recording medium, the method comprising:
- obtaining information on a temperature of the recording medium; and
- performing control such that display associated with a temperature of the recording medium is performed based on the obtained temperature information when a processing speed of recording of content on the recording medium satisfies a predetermined condition, wherein the display controller performs control such that display indicating the temperature of the recording medium is high is performed when the processing speed of recording of content on the recording medium is higher than a processing speed for the obtained temperature information.

18. A non-transitory computer readable recording medium which records programs that cause a computer to function as the units of the recording apparatus according to claim 1.

* * * * *